United States Patent
Catalano et al.

(10) Patent No.: US 10,372,502 B2
(45) Date of Patent: *Aug. 6, 2019

(54) FLEXIBLE DEVICE FUNCTION AGGREGATION

(71) Applicant: International Business Machines Corporation, Armonk, NY (US)

(72) Inventors: Pasquale A. Catalano, Newburgh, NY (US); Casimer M. DeCusatis, Poughkeepsie, NY (US); Rajaram B. Krishnamurthy, Wappingers Falls, NY (US); Michael Onghena, Poughquag, NY (US); Anuradha Rao, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/969,115

(22) Filed: May 2, 2018

(65) Prior Publication Data

US 2018/0246769 A1    Aug. 30, 2018

Related U.S. Application Data

(63) Continuation of application No. 14/963,596, filed on Dec. 9, 2015, now Pat. No. 9,996,397.

(51) Int. Cl.
*G06F 9/46* (2006.01)
*G06F 9/50* (2006.01)
(Continued)

(52) U.S. Cl.
CPC .............. *G06F 9/5061* (2013.01); *G06F 1/26* (2013.01); *G06F 1/28* (2013.01); *G06F 1/30* (2013.01);
(Continued)

(58) Field of Classification Search
None
See application file for complete search history.

(56) References Cited

U.S. PATENT DOCUMENTS 9,939,873 B1    4/2018  Catalano et al.
9,996,397 B1 *  6/2018  Catalano ............... G06F 9/5061
(Continued)

OTHER PUBLICATIONS

Catalano et al., "Portable Device Control and Management," U.S. Appl. No. 14/963,582, filed Dec. 9, 2015.
(Continued)

*Primary Examiner* — Kenneth Tang
(74) *Attorney, Agent, or Firm* — Cantor Colburn LLP; Steven Meyers

(57) ABSTRACT

Apparatus, systems and methods aggregating electronic devices for sharing functionality to fulfill requested tasks, while also monitoring and controlling battery energy levels in these electronic devices to ensure sufficient battery power is available on the devices, individually or collectively, to fulfill a requested task. The electronic devices are positioned in proximity to a computing device for determining functionalites that may be shared amongst the various electronic devices to fulfill the requested task. These electronic devices are also provided in proximity to a charge distribution unit (CDU) for determining if each electronic device has enough battery power to complete all, or a portion, of the requested task. If any device needs charging, the CDU allocates and distributes battery power from one or more other device batteries and/or power outlet. The charging power is then transferred to the electronic device in need of charging to fulfill the requested task.

10 Claims, 6 Drawing Sheets

(51) Int. Cl.
  *G06F 1/3212* (2019.01)
  *G06F 1/26* (2006.01)
  *G06F 1/28* (2006.01)
  *G06F 1/30* (2006.01)
  *G06F 1/329* (2019.01)

(52) U.S. Cl.
  CPC ............ *G06F 1/329* (2013.01); *G06F 1/3212* (2013.01); *Y02D 10/174* (2018.01); *Y02D 10/24* (2018.01)

(56) References Cited

U.S. PATENT DOCUMENTS

| | | | |
|---|---|---|---|
| 2008/0072292 A1* | 3/2008 | Narjala ............... | H04L 12/2807 726/4 |
| 2016/0062429 A1* | 3/2016 | Cudak ....................... | G06F 1/26 713/300 |

OTHER PUBLICATIONS

List of IBM Patents or Patent Applications Treated as Related; Date Filed: May 2, 2018, 2 pages.
Catalano et al., "Reconfigurable Caching and Backup for Devices," U.S. Appl. No. 15/905,092, filed Feb. 26, 2018.
Catalano et al., "Flexible Device Function Aggregation ," U.S. Appl. No. 14/963,596, filed Dec. 9, 2015.

* cited by examiner

FLEXIBLE DEVICE FUNCTION AGGREGATION

RELATED APPLICATIONS

The present application is a continuation application of U.S. application Ser. No. 14/963,596 (entitled "Flexible Device Function Aggregation", filed Dec. 9, 2015), which relates to co-pending U.S. application Ser. No. 14/963,582 (entitled "Portable Device Control and Management", filed Dec. 9, 2015). The entire disclosures of U.S. application Ser. Nos. 14/963,596 and 14/963,582 are incorporated herein by reference. This application also relates to U.S. patent application Ser. No. 14/963,609 (entitled "Reconfigurable Caching and Backup for Devices"), which became patented on Apr. 10, 2018 as U.S. Pat. No. 9,939,873. The entire disclosures of U.S. Pat. No. 9,939,873 are incorporated herein by reference.

TECHNICAL FIELD

The present invention relates generally to electronic devices, and more specifically, to systems and methods for aggregating electronic devices for sharing functionality to fulfill requested tasks, while also monitoring, managing and controlling battery energy levels in these electronic devices to ensure sufficient battery power is available on the devices, individually or collectively, to fulfill a requested task.

BACKGROUND

Numerous different types of mobile electronic devices currently exist for both computing and/or communication applications. These mobile computing and/or communication devices are widely accepted and used in everyday life applications ranging from business, research, technology, schooling, networking, leisure, athletics, travel, and the like. These mobile electronic devices include, for example, a notebook, netbook, tablet, smart phone, car GPS, bicycle GPS, medical devices, Internet access device, social media access device, and the like. Generally, each mobile device is equipped with hardware and software that provide the device with a variety of resources and capabilities including wireless networking capabilities, multimedia capabilities (e.g., viewing video, pictorial content, text, documents, etc.), file sharing resources, and the like. The development of these resources and capabilities is continually growing and expanding.

In recent years mobile computing and/or communication devices have been provided with collaborative applications that enable different mobile devices to communicate with one another, and even share information and/or resources. For instance, some collaborative applications allow two or more mobile devices to share information back and forth, share computing capacities, and even share video or pictorial content. However, in these known collaborative applications, as data is being shared amongst the mobile electronic devices, battery power in these sharing mobile devices may become too low for operation, or battery power may even run out all together. When the battery power becomes too low for efficient operation, or is completely depleted, sharing of data may slow or stop all together.

For individual mobile electronic devices, portable power banks are often used as a battery backup power source. In using a battery backup power bank, it is often the end user that must determine when a mobile device needs recharging. Based on the user's determination of low or no battery power, the end user must then connect the mobile device to the power bank for battery recharge. In these instances the mobile device battery may be completely depleted and require a significant amount of time to recharge, such that, the device may not be ready for use when the end user needs it. Many currently available battery backup power source undesirably only charge one device at a time. While there are known battery backup power banks that charge two mobile devices at the same time, the charging power is split equally amongst the connected devices. This may lead to one or both of these mobile devices not receiving enough power to operate efficiently or completely.

With electronic mobile devices having insufficient power levels after charging with known power packs, the functionality and operational capabilities of these devices is reduced. For instance, the process of transferring media from one mobile device to another mobile device generates hierarchy and relationships between these two devices. These hierarchies and relationships are used to establish which device will carry out which function(s) or operation(s), and may be used at the time generated or stored in memory and cached for later use or reuse. When the transfer of such media fails or is cut short due to one of the devices not have enough battery power, these important hierarchies and relationships between mobile device will not be established and stored for later use. This leads to the time consuming task of rebuilding hierarchies and relationships between mobile devices, and hoping that the connections will not fail again due to insufficient battery power.

Accordingly, needs continue to exist in the art for improved apparatus, systems and methods that manage and allocate different distributions of power levels to different mobile devices, followed by discharging these different power charges to the mobile devices for continuously maintaining a battery charge on the devices so that each device has sufficient battery power for completing a task/function when it is needed for use.

SUMMARY

According to one or more embodiments of the present invention, the invention is directed to systems and methods for aggregating electronic devices for sharing functionality. The systems and methods include a computing device, and a plurality of electronic devices that intercommunicate with each other and with the computing device. Function signals are transmitted from the plurality of electronic devices to the computing device. These function signals identify each of the plurality of electronic devices and functions capable of being performed on or using such electronic devices. The systems and methods also include a storage device within the computing device storing tables of the identified plurality of electronic devices along with respective functions. Upon a requested task being input into the present systems and methods, an aggregated functionality component within the computing device compares the requested task to the tables of identified plurality of electronic devices, and their respective functions, to determine selected ones of the electronic devices that are capable of performing at least a portion of the requested task. The aggregated functionality component generates an aggregated device of the present systems and methods. The aggregated device is a combination of the selected ones of the electronic devices that together share resources, functions and capabilities to accomplish the requested task.

In one or more embodiments the systems and methods may also include a charge distribution unit in communication with the computing device. The charge distribution unit receives battery signal data output by the plurality of electronic devices to determine whether each of the selected ones of the electronic devices within the aggregated device have enough battery power to accomplish the requested task. If it is determined that battery power is required in any identified selected one of the electronic devices, the charge distribution unit initiates transfer of battery power thereto for ensuring that the requested task is completed.

In certain embodiments of the invention, the systems and methods may also include a power source, a monitoring component, and a controller. The monitoring component is in communication with the plurality of electronic devices to continuously monitor and receive the battery signal data. The controller receives the battery signal data from the monitoring component, and analyzes such battery signal data to determine an allocated amount of battery power charge required for charging each electronic device battery to a desired battery charge level. The charge distribution unit, which is in communication with the power source, the plurality of electronic devices and the controller, initiates transfer and splitting of each allocated amount of battery power charge from the power source to each of the selected ones of the electronic devices within the aggregated device to ensure battery power is available on each electronic device for accomplishing the requested task.

BRIEF DESCRIPTION OF THE SEVERAL VIEWS OF THE DRAWINGS

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION

Figure 1:
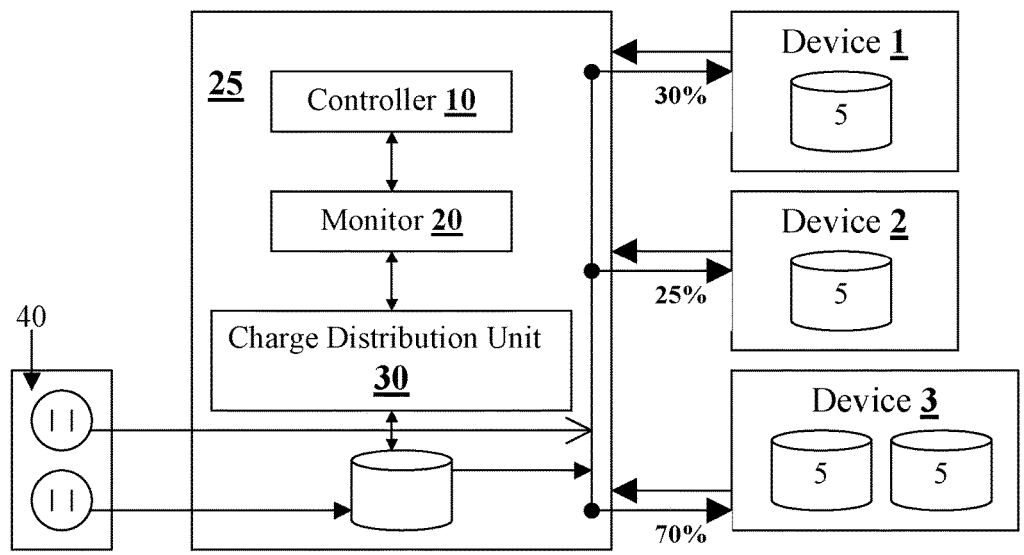
FIG. 1 illustrates a system for proactively controlling and maintaining battery power levels in electronic devices in accordance with one or more embodiments of the invention.

Reference is made herein to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative. Likewise, reference to "the invention" shall not be construed as a generalization of any inventive subject matter disclosed herein.

Allowing an electronic device battery drain down to a zero power state (0% battery life) is deleterious to the life and/or longevity of such battery. When battery power gets too low the force of charging these devices causes energy to rush through the device. This undesirably heats up the device's internal components including its battery, and thereby shortens battery life. The various embodiments of the invention provide methods, systems and components that avoid these problems by managing and controlling battery power levels simultaneously across multiple electronic devices to prevent each battery life from draining down to a 0% battery life state.

The various embodiments of the invention provide systems, apparatus, and methods that continuously monitor and maintain battery power levels on one or more mobile electronic devices connected to, or in communication, with the invention. As electronic devices are connected to the present systems and/or apparatus, battery power signal data and device pattern usage data is input into a controlling computing device from each of these devices. This incoming data is used to build hierarchies of cached tagged frequency data and pattern usage hierarchies. The incoming signal data is analyzed to identify how much battery power is on each of these devices, and using the built hierarchies, it is determined how much battery power each mobile device needs to fulfill a task, which may be a function, operation, procedure, service, and the like. The invention then allocates amounts of battery power, which may be different or the same, to the various mobile devices that will provide each device with sufficient operating power. A charge distribution unit of the invention then discharges the different amounts of allocated battery power to the various mobile devices so that each device has sufficient battery power to ensure task/operation completion.

By continuously monitoring power state levels of each battery in communication with the present invention, battery levels across multiple electronic devices are maintained to avoid drainage down to zero power level state. This ensures that each device in communication with the invention has sufficient battery power so that it is ready for use when needed, or when an end user wants to use the device.

The invention enables a number of different mobile devices to be in communication with each other, with each device having its battery levels managed and maintained to ensure sufficient battery power thereon for a time when it is needed. With the devices in communication with each other, these mobile electronic devices can share resources, functions and capabilities to accomplish a predefined task (e.g., function, operation, procedure, service, etc.), all while the battery management and distribution components of the invention ensure each device has sufficient battery power to fulfill and complete such task(s).

As these devices combine together, a new aggregated device is established which, in turn, generates new features and functionality by the application and use of the combined functionalities from the different electronic devices. These aggregated device features and functionality may be stored and cached for later use and retrieval. This previously stored and cached aggregated device data may then be used in combination with the battery management and distribution components to ensure that any subsequently configured aggregated device will have sufficient battery power to fulfill and complete its intended purpose or task. In one or more embodiments of the invention this cached data may further be managed, proactively backed-up and aggregated, as well as the cache hierarchies thereof be reconfigured as new signal data is input from one or more new or previously used electronic devices.

The invention is described in more detail below in reference to FIGS. 1-8B. It should be understood that various embodiments of the invention may include and/or implement usage of embedded systems, embedded electronic circuitry (e.g., a printed circuit board having electronic circuitry), electronic hardware, computer hardware, computer software and/or applications, system and network management software and hardware (devices), resource management, and the like.

It should be appreciated by one skilled in the art that in describing the various embodiments of the present invention herein, terminology may be used for describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, and/or components, but do not preclude the presence or addition of one or more other features, integers, steps, operations, elements, components, and/or groups thereof.

As will also be appreciated by one skilled in the art, embodiments of the invention may be embodied as systems, methods or computer program products. Accordingly, aspects of the invention may take the form of an entirely hardware embodiment, an entirely software embodiment (including firmware, resident software, micro-code, etc.) or an embodiment combining software and hardware that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this application, a computer readable storage medium may be any tangible medium that can contain, store, communicate, propagate, or transport a program for use by or in connection with an instruction operating system, apparatus, or device. Note that the computer usable or computer readable medium could even be paper or another suitable medium upon which the program is printed, as the program can be electronically captured via, for instance, optical scanning of the paper or other medium, then compiled, interpreted, or otherwise processed in a suitable manner, if necessary, and stored in a computer memory.

A computer readable signal medium may include a propagated data signal with computer readable program code embodied therein, for example, in baseband or as part of a carrier wave. This propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction operating system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computing device (e.g., desktop computer, laptop computer, mobile computing device, etc.), partly on the user's computing device, as a stand-alone software package, partly on the user's computing device and partly on a remote computing device or entirely on the remote computing device or server. In the latter scenario, the remote computing device may be connected to the user's computing device through any type of network, including a local area network (LAN) or a wide area network (WAN), or the connection may be made to an external computing device (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may also be stored in a computer readable medium that can direct a computing device or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computing device or other programmable data processing apparatus to cause a series of operational steps to be performed on the computing device or other programmable apparatus to produce a computer implemented process. The instructions that execute on the computing device or other programmable apparatus provide processes for implementing the functions/acts specified in the flowchart and/or block diagram block or blocks.

It will further be appreciated by one skilled in the art, embodiments of the present invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

In cloud computing a user may access any of the resources that reside in the cloud at any time, and from anywhere across the Internet. In context of the present invention, a user may access applications or related data available in the cloud that allow video and/or audio to be transferred from one window/tab to another window/tab, or from one device to another. For example, the hardware, software, networking, connectivity, services, etc. of the cloud computing environment provide a user with the online service(s) of continuously viewing a video regardless of the window/tab the user is viewing by transferring the video(s) from its original window/tab (e.g., from its original URL) to the window/tab that the user is currently viewing. Cloud computing identifies and locates the video to its exact source code within the source code of the window/tab on which the video resides, copies the source code of the video and uploads it to a window/tab that is currently being viewed by the user so that the user is provided with the service of viewing the video(s) in a non-occluded manner. When hosted in a cloud environment, browsers are modified to accept applications in the cloud environment for offering and implementing the services of the various embodiments of the invention.

While the foregoing generally describes the present invention and aspects thereof, reference is now made to the drawings for a more detailed description of the various embodiments of the invention. Since mobile device displays are often too small to view and/or accomplish data-intensive high-productivity tasks, the invention provides methods, apparatus and computer program code aspects that extend the visual display of video and/or pictures across monitors or screens of multiple aggregated mobile devices via a network, while at the same time allowing the end user of the invention to modify and/or alter his experience with the aggregation session. These aspects of the invention run, operate, implement, and control the "Hive" application process flow of the invention as described herein.

Portable Device Control and Management:

Referring to FIGS. 1-5, in one or more embodiments the invention is directed to proactively determining battery level(s) and battery power usage patterns in electronic (i.e., digital) devices. In accordance with the invention, once these battery levels and power usage patterns have been determined, battery power levels are controlled and managed by distributing charge or power to the electronic devices based on their battery power levels, battery power usage patterns, or even both in combination.

The electronic devices may include portable, mobile and stationary devices. For instance, the electronic devices may include, but are not limited to, a smartphone, GPS device (e.g., car GPS, bicycle GPS, smartphone GPS, etc.), a tablet, a notebook, netbook, medical devices, social media device (e.g., a Facebook networking device), an Internet access device (e.g., a google networking device), various mobile computing and/or communication devices, and the like. Generally, each of these electronic devices is equipped with hardware and software that provide the device with a variety of resources and capabilities including wireless networking capabilities, multimedia capabilities (e.g., viewing video, pictorial content, text, documents, etc.), file sharing resources, input/output capabilities, and the like. The electronic devices also include one or more batteries that allow each device to operate and run its hardware and software components. Over time and usage, the operating hardware and software drain battery life within the device, which eventually needs recharging.

In accordance with one or more embodiments the invention continuously monitors, analyzes and stores battery usage patterns and power levels in these one or more electronic device(s). Components of the invention determine an amount of charging power required to bring each individual electronic device back to, or near, a full battery charge level. Alternatively, an amount of charging power may be determined to bring an electronic device battery level up to a sufficient power level that is required for running a particular program, software, application, hardware, and the like.

Components of the invention for proactively determining battery energy levels include, but are not limited to, one or more electronic devices 1, 2, 3, etc. each having a battery, or batteries 5, that require charging. The components also include a controller 10, a monitor (also referred to herein as "monitoring component") 20, a charge distribution unit (also referred to herein as "CDU") 30, power sources (e.g., battery of another electronic device 15 or 17), a wall electrical power source outlet 40, and the like. The controller 10 may include, but is not limited to, a tablet, notebook, netbook, smartphone, or any other device that has computer processing capabilities and computer memory for receiving, storing, and analyzing input data from other electronic or digital devices 1, 2, 3, etc.

In accordance with the invention, the charge distribution unit 30 works in conjunction with monitoring component 20 and the controller 10. Each of these controller 10, monitoring component 20, and charge distribution unit 30 devices may be separate components having circuitry hardware (e.g., a printed circuit board with electrical circuitry) and/or software for implementing the proactive determination of battery energy levels in accordance with the invention. Controller 10, monitor 20, and charge distribution unit 30 may reside within a single computing device, or one or more computing devices, in any combination thereof.

As shown in FIG. 1, the controller 10, monitoring component 20, and charge distribution unit 30 may all be within a single control computing device having a battery source 15 of one or more batteries. The controller 10, monitoring component 20, and charge distribution unit 30 all interact with one another inside computing device 25. The single control computing device 25 may be any apparatus or system having computer processing capabilities, memory, and input/output capabilities, and as such, having the ability to store logic and perform computing functionality. For instance, the single computing control device 25 may be a laptop or tablet that includes controller 10, monitoring component 20, and charge distribution unit 30 devices residing therein and being integrated with other hardware and/or software of such laptop or tablet. In these embodiments, the single computing device 25 may have one or more ports for plugging the computing device 25 into an electrical power wall socket 40 to receive electrical charge for providing power to battery source 15.

The single control computing device 25 may further include various other ports for receiving and transmitting signals to one or more electronic devices 1, 2, 3, etc. that each have one or more batteries 5. Electronic devices 1, 2, 3, suitable for use in the present invention are those that output a signal having data indicating at least a current amount of battery power remaining in such device, as well as being able to receive input power to charge the battery based on such current amount of battery power identified in the transmitted signal. The various electronic devices 1, 2, 3, etc. may further be able to output its own stored battery power for sharing amongst other electronic devices connected to the present systems. These one or more electronic devices preferably can receive input power charge, and output signals and battery power, either through wired connections (e.g., cables, USB, or other means of connecting power to wire (i.e., run) the devices), or through wireless connections. Wireless connections may include, but are not limited to, a wireless charging mat, wireless charging components, wireless communications, solar energy (e.g., solar photovoltaic cells), and the like.

As shown in FIG. 1, the controller 10, monitor or monitoring component 20, and charge distribution unit 30 may each be separate, distinct physical hardware that is integrated into the body of the computing device 25. Each of these components 10, 20, 30 may be individual structure(s) having hardware, electrical circuitry configured on one or more circuit boards, and software all working together and being integrated into a physical device that is fitted and secured inside the computing device 25. In alternative embodiments, at least one or both of the controller 10 and monitoring component 20 may be hardware, electrical circuitry, and/or software already residing within the computing device 25. This computing device 25 hardware and software is reprogrammed or reconfigured, such that, the functionality of such hardware is altered and when used with the software of the invention performs the new functionality of controlling and/or monitoring incoming battery signal data, as well as outputting distributed amounts of battery power at selected times to charge device battery power in accordance with the invention.

Figure 2:
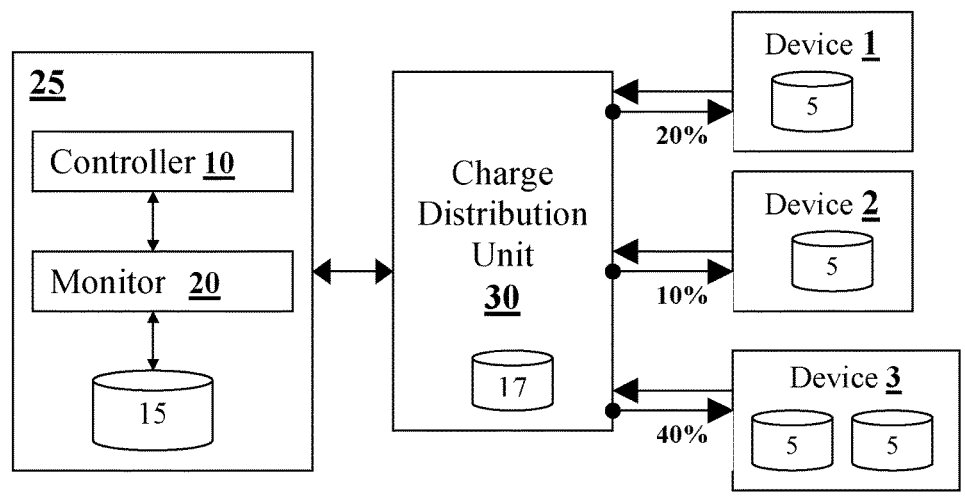
FIG. 2 illustrates another system for proactively controlling and maintaining battery power levels in electronic devices in accordance with one or more other embodiments of the invention.

Referring to the controller, in either embodiment of FIG. 1 and FIG. 2, the controller 10 is configured to receive, either through wired or wireless connections, the incoming battery signal data including amounts or percentage of battery charge existing on the external electronic devices 1, 2, 3, etc. The controller 10 analyzes this incoming data and determines an amount of power or energy that is needed to be input into each individual electronic device to place such electronic device(s) at a desired battery charge level. This desired amount of incoming power or charge may be a full battery charge, or a percentage (predefined amount) of battery charge that places the electronic device's battery at a power level sufficient to perform a particular task or operation of the electronic device.

Also within the battery signal data, that is incoming from each of the electronic devices 1, 2, 3 etc., is battery pattern usage data. The battery pattern usage data includes information that identifies where, when and how the battery or batteries are being drained within each particular electronic device 1, 2, 3, etc. The 'where' battery drainage parameter may identify the particular task or operation that is draining battery life (e.g., within processing applications, within data roaming services, within games, etc.). The 'when' battery drainage parameter identifies particular times or time ranges in the day(s), week(s) or month(s) that battery drainage activity is high. 'How' battery drainage is occurring may include more specific data about the 'where' battery drainage is occurring. For instance, the 'how' parameter may identify specific types of data roaming that are draining battery (e.g. a data roaming GPS service is requiring significant amount of battery usage, and as such, is quickly draining the cell phone battery), it may identify a particular game that requires a lot of resources and battery power to run such game, and the like.

In accordance with the invention, once the one or more electronic devices 1, 2, 3 etc. are physically connected to or within the wireless communication range of the present system, the battery signal data, including battery pattern usage data, is input into and received by the charge distribution unit 30. Again, as shown in FIG. 1 the charge distribution unit 30 may reside within a single computing device 25 along with controller 10 and monitoring component 20, or it may be a physically separate device from the computing device 25 as shown in FIG. 2. The physically separate charge distribution unit 30 of FIG. 2 may include its own CDU battery 17 for receiving and outputting charge. This separate charge distribution unit 30 may also have one or more ports adapted for plugging into a wall socket 40 for transmitting power and charging the CDU battery 17 (see, FIG. 3). Alternatively, the separate charge distribution unit may have a wireless communication for recharging CDU battery 17 (see, FIG. 4).

Again, in those embodiments where the charge distribution unit 30 is hardware integrated into the single computing device 25, it is the single computing device 25 that has one or more ports for connection of the one or more electronic devices 1, 2, 3 etc. The single computing device 25 would also have a power port for itself to direct charge to its own battery 15. Again, it should be appreciated and understood that the electronic device 1, 2, 3 etc. port connections may be made through wired connections plugged directly into the computing device 25, or each may be made by wireless connections with the computing device 25. In wireless connections, the computing device 25 includes hardware and software to support a wireless charging protocol to both receive incoming battery level signals and usage pattern data from other portable devices, while also being able to output power or energy to charge the one or more electronic device 1, 2, 3 etc. batteries. Also in the wireless systems of the invention, separate radios may be used to allow for modulation of power on in conjunction with the wireless signals.

Figure 3:
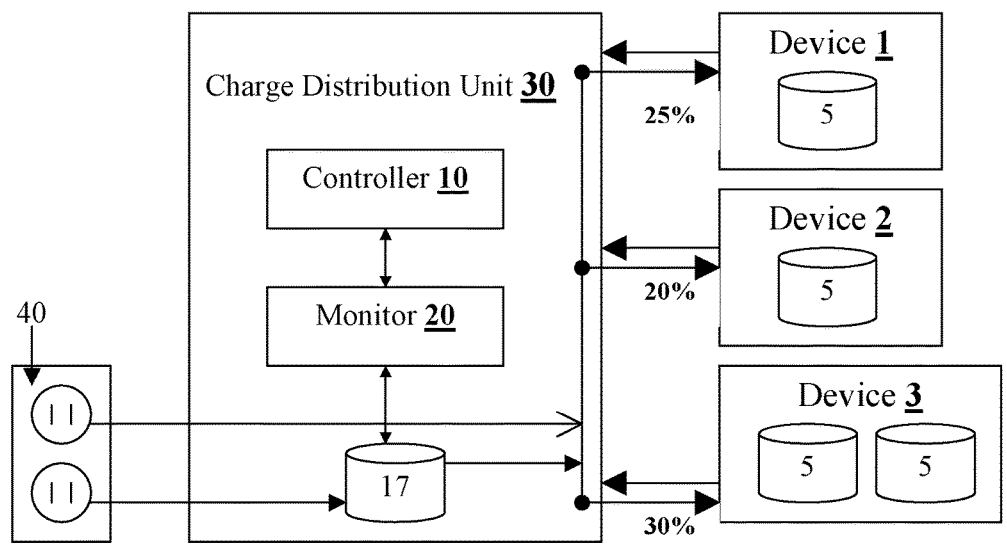
FIG. 3 illustrates yet another system for proactively controlling and maintaining battery power levels in electronic devices in accordance with embodiments of the invention.

In other embodiments where the charge distribution unit 30 is a physically separate hardware component (i.e., it is apart from the computing device 25), this stand-alone charge distribution unit 30 may have one or more ports adapted for wired connections to the electronic devices 1, 2, 3 etc. As shown in FIG. 1 and FIG. 3, the separate charge distribution unit 30 may have its own power port for direct wired connection to a wall socket 40 for charging the CDU battery

17. Alternatively, the charge distribution unit 30 may be a wireless device that receives wireless charging transmissions and/or transmits wireless charging transmissions. Again, this wireless charge distribution unit 30 includes both hardware and software to support a wireless charging protocol to both receive incoming battery level signals and usage pattern data from other portable devices, while also being able to output power or energy to charge the one or more electronic device 1, 2, 3 etc. batteries.

Figure 4:
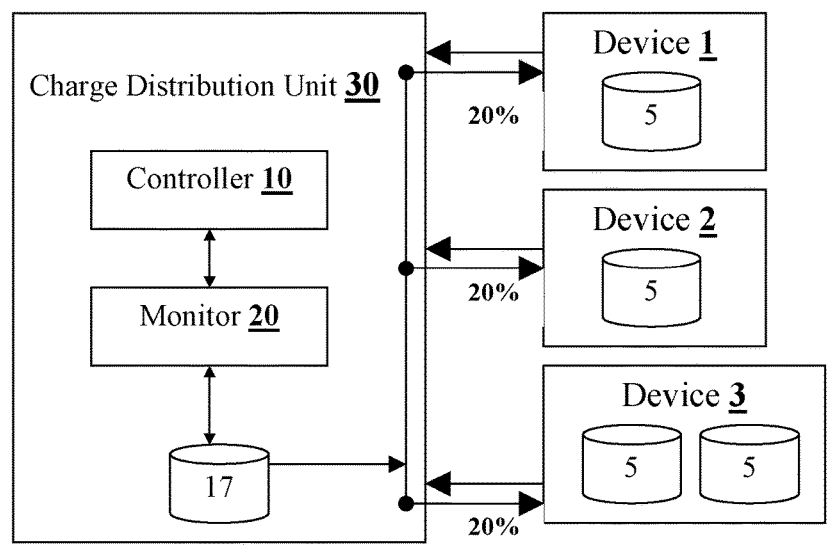
FIG. 4 illustrates an apparatus for proactively controlling and maintaining battery power levels in electronic devices in accordance with embodiments of the invention.

For instance, referring to FIG. 2 and FIG. 4, the charge distribution unit 30 may be a wireless charging mat, a wireless charging device, a wireless communication device, and the like. The computing device 25 may include controller 10, monitoring component 20, and computing device battery 15 therein. The number of electronic devices 1, 2, 3 etc. communicate with the wireless charge distribution unit 30, which in turn communicates with the computing device 25. In accordance with the invention, one or both of the wireless communications between (1) the charge distribution unit 30 and electronic devices, and between (2) the charge distribution unit 30 and the computing device 25, may be through wireless connections and communications. It should also be appreciated that one of these connections may be made through wired connections. For instance, the connection and communications between the charge distribution unit 30 and the computing device 25 may be wired, while the connection and communications between the charge distribution unit 30 and the various electronic devices are wireless (e.g., the charge distribution unit 30 may be a wireless charging mat).

Further as shown in FIGS. 3 and 4, the charge distribution unit 30 may itself be a device having hardware and software for computer processing to accomplish the tasks of continuously monitoring, controlling, managing and distributing charge or power amongst a plurality of electronic device batteries in accordance with the invention. In these embodiments, the charge distribution unit 30 includes controller 10, monitoring component 20, and CDU battery 17, hardware, software and computing displays, key and/or controls, and the like. This separate charge distribution unit 30 may be charged by a wall socket 40 (FIG. 3), or it may be powered by wireless connections and communications (FIG. 4).

While not meant to be limiting, as an example of the invention the individual charge distribution unit 30 may comprise a charge splitter configured with hardware and software to implement the invention. In this example the charge distribution unit 30 may be referred to as a 'smart' charge distribution splitter that is in communication with the plurality of electronic devices 1, 2, 3, etc. for receiving the incoming battery signal data, which includes percentage of battery remaining on each electronic device, battery pattern usage data, as well as any identification within each signal of which electronic device it is associated with. The 'smart' charge distribution splitter also includes the monitoring component 20 and controller 10. The monitoring component 20 continuously monitors and receives the incoming battery signal data from the connected electronic devices, which is then stored in memory of the charge distribution unit. In this example, the controller 10 analyzes the incoming battery signal data and any stored data to determine an allocation apportionment of charge that is to be output or transmitted from the 'smart' charge distribution splitter to each connected electronic device to charge their batteries up to a desired charge or power percentage. Since the incoming battery signal data includes the identification of which electronic device each signal belongs to, the 'smart' charge distribution splitter is able to allocate different amounts of power to identified specific electronic devices. FIGS. 1-4 show different allocations of power being output to the connected electronic devices. These amounts may be unequal or equal power percentages. In instances when the charge distribution unit is connected to a wall power source 40, the output power can come from both the wall power source 40 and the CDU battery 17 such that the output charge is a greater charge rate than the CDU battery 17 can output alone.

Figure 5:
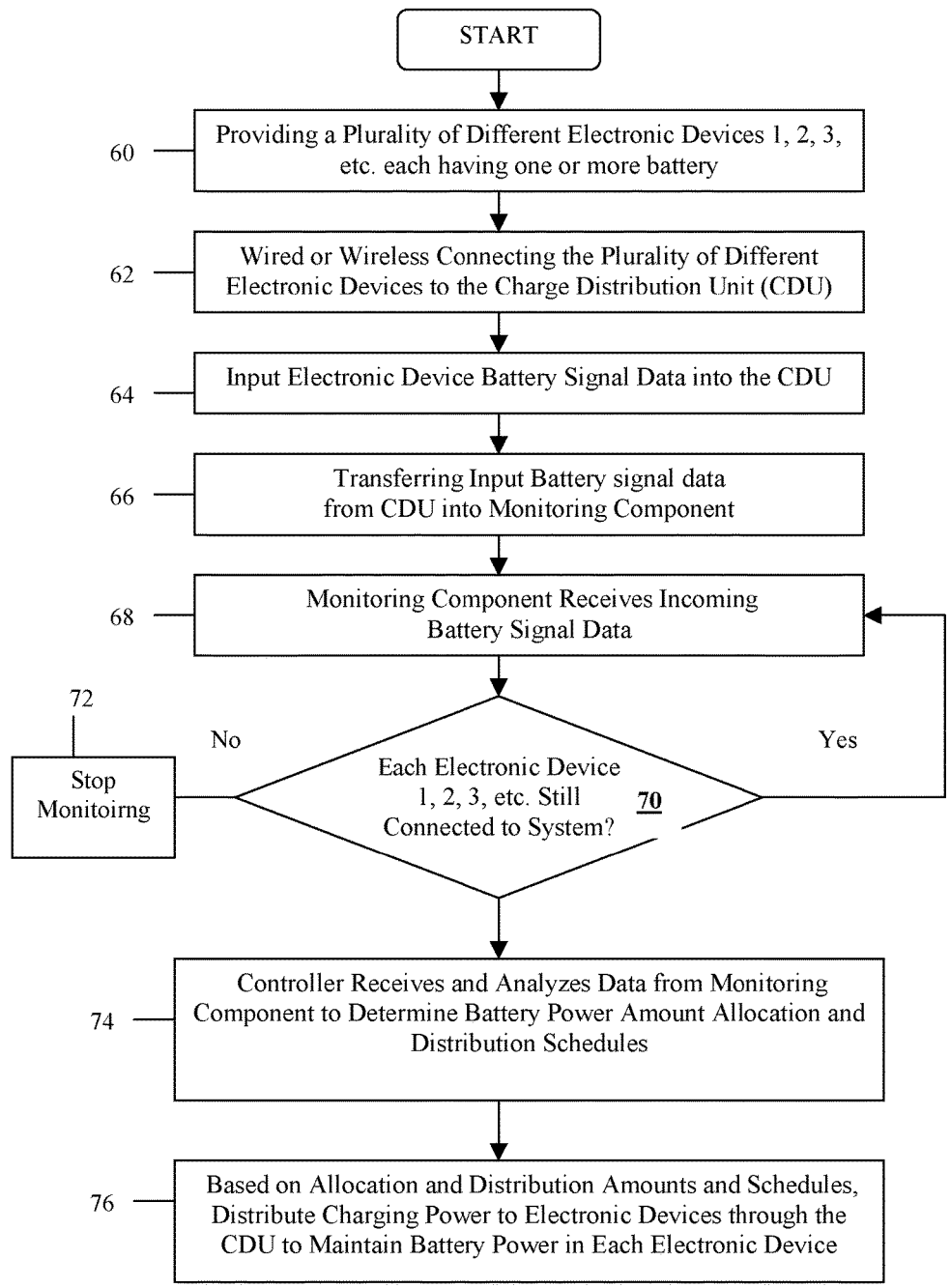
FIG. 5 shows a process flow for methods of proactively controlling and maintaining battery power levels in electronic devices in accordance with one or more embodiments of the invention.

Referring to FIG. 5, one or more embodiments of methods and systems implementing the above described hardware and software components is shown for proactively determining and managing battery power levels and usage patterns in a number of different electronic devices 1, 2, 3, etc. The process may be started by providing a number of different electronic devices 1, 2, 3, etc., each having one or more batteries in need of monitoring and charging (step 60). Again, the electronic devices 1, 2, 3, etc. suitable for use in the invention are those that are able to output battery power levels and usage patterns, receive input electrical charging power to charge their respective batteries, as well as being able to output or export at least a portion of its battery 5 power to share amongst any and all other electronic devices connected thereto within the charge distribution and management systems of the invention.

The plurality of different electronic devices 1, 2, 3, etc. are connected to, or in wireless communication with, the charge distribution unit 30 for both transmitting input data into the charge distribution unit 30 and receiving output battery charging power (step 62). The charge distribution unit 30 may be integrated into the single computing device 25 (having the controller and monitoring component), or it may be a separate distinct hardware component. The charge distribution unit 30 may include one or more batteries 17 for storing and sharing battery power, as well as may be adapted to be plugged into a wall power outlet 40. In this manner, the charge distribution unit 30 is able to transmit power through it from the wall power outlet 40, from its own battery 17 (or from battery 15 of device 25), or both from the power outlet 40 and CDU battery 17. By providing charging power from both the power outlet 40 and CDU battery 17, the invention allows and provides a maximum charge rate to devices in need of charging since charging is being input into the receiving device from two or more power output devices. This enables combined output power charging from multiple devices, which is greater than the charge coming from any single one of such charge outputting devices. In transferring battery power from CDU battery 17, the charge distribution unit 30 stores charge in its central repository of batteries 17 for later use and transfer to other devices in need of battery power. This reserved central repository of batteries 17 may be used in emergency conditions or when the prediction of the energy usage of the devices is below actual usage.

Once the electronic devices are in communication with the charge distribution unit 30, the battery signal data from such devices is transmitted from the charge distribution unit 30 (step 64) to the monitoring component 20 (step 66). It should be appreciated that each electronic device 1, 2, 3, etc. may also monitor its own usage pattern information and store this data in its own memory, which is then passed on to the charge distribution unit 30 for use in the invention. The monitoring component 20 may reside within the computing device 25 (FIGS. 1 and 2), or within the separate charge distribution unit 30 (FIGS. 3 and 4). Again, the input battery signal data may include battery power level data, battery pattern usage data (e.g., time of day of battery usage, duration of usage, general information on whether the battery is being drained by applications or computing resources), detailed identifications of specific applications and/or resources draining battery power, and the like.

The monitoring component 20 receives the incoming battery level data and usage pattern data, and transfers this data to the controller 10. In one or more embodiments, the monitoring component 20 continuously receives, tracks and monitors the data incoming from each of the electronic devices 1, 2, 3, etc. connected to the present system through the charge distribution unit 30 (step 68). It tracks each electronic device by determining whether each of such individual electronic devices is connected to the present system (step 70). If an electronic device is still connected to the present battery monitoring and power distribution system, then the process flow reverts to step 68 for the continual receipt and monitoring of incoming battery level usage data and usage pattern data. However, if no signal is received from the electronic device, then it is determined that the device has been disconnected from the system, and the monitoring thereof stops (step 72). In accordance with the invention, each device may be disconnected from the present system by simply unplugging the connection or charging wire (in wired systems), or by removing the electronic device form the vicinity or location of the charge distribution unit 30 to cease communication therewith (in wireless systems).

As the monitoring device 20 receives the incoming battery signal data 109 (i.e., the battery level usage data and usage pattern data) it is transferred to the controller 10 and stored in memory on the particular device the monitor 20 and/or controller 10 reside. It should be appreciated that the battery signal data may also reside in memory of the controller 10 itself. In accordance with the invention, the incoming battery signal data may be stored in memory as a table of allocation of battery usage and pattern usage. This battery power usage and pattern usage data includes use patterns of how much (e.g., percentage of) battery is being used for different activities/functions (e.g., computing, processing, gaming, Internet browsing, display, etc.) and at the different times such activities/functions are occurring on the electronic device.

In accordance with the invention, the controller 10 includes hardware and software for analyzing the incoming battery signal data to determine distribution and allocation of charge to the one or more electronic devices 1, 2, 3, etc. connected to the system. The controller analyzes the stored incoming signal of battery level usage and usage pattern data in connection with how much, when and where the battery is being drained in each electronic device. Using this analyzed battery signal data, the controller 10 determines and generates charge distribution and allocation for each of the one or more electronic devices 1, 2, 3, etc. connected to the system.

This generated charge distribution and allocation data identifies an amount of charging power that is to be distributed to each electronic device 1, 2, 3, etc. for bringing its battery charge level to a predetermined or set amount (or percent charged). For instance, as shown in FIGS. 1-4 the different electronic devices 1, 2, 3, etc. may be allocated different amounts of charging power (e.g., 10%, 30%, . . . 70%, etc.). Since the invention avoids battery power from draining down to 0%, the allocated charge may range anywhere from above 0% to just below 100%. The generated charge distribution and allocation data also identifies when (i.e., what times) such charging is to be performed based on the stored historical battery usage patterns so that each device is charged for optimal use. That is, the controller 10 outputs the battery charging criteria for how much charge is to be distributed to selected electronic devices and when such charging is to take place.

Since the monitoring device 20 continually receives the incoming battery signal data, some of the incoming data may not be consistent with normal electronic device battery usage levels and use patterns. For instance, a user may unintentionally leave a GPS application running during the afternoon, thereby depleting the device battery power. Based on the stored usage historical data of each device, the controller may determine that this incoming battery signal includes use data that is not within the normal parameters (or thresholds) of the device's customary usage, and based thereon, mark this incoming signal and its data as an outlier signal data. In these instances, after the application/activity has depleted battery power, the incoming signal will include not only this outlier (abnormal) battery usage data, but also an identification of the activity/function/application that drained the battery (e.g., an identification that the battery was drained by a running application, and more specifically, drained by the GPS application).

With the outlier signal data being identified by the continuous monitoring of the invention, normal electronic device battery power usage patterns can be set that identify true and acceptable battery threshold usage parameters. As such, any incoming battery signal data having battery usage levels falling outside of these set usage thresholds may be considered to be outlier signal data. In order to prolong the battery life, once identified, these outlier (non-normal) battery power usage data and patterns are not implemented in determining each device's normal battery usage patterns, nor is this outlier data used to determine battery power allocation and distribution in accordance with the invention. Another advantage of identifying this outlier signal data is that once identified, the charge distribution unit 30 may communicate with the electronic devices 1, 2, 3, to send a message to the user to quiesce (i.e., render temporarily inactive) an identified source of outlier data within the electronic device (e.g., tell the user to disable a browser web page that is continually being refreshed and using up the battery power in the process) for prolonging the battery power level and battery life.

Based on the stored battery signal data, and the determined distribution and allocation of charge for each electronic device, charging power may then be shared and distributed amongst the various electronic devices. Also, based on the historical battery usage data and patterns of power use, the split allocation of power may not be performed until a predefined or preset time, or even perhaps not until the battery has been drained down to a set power level which may be defined and set by battery level threshold values. In one or more embodiments, the thresholds can be user defined threshold values, or they may be determined by the CDU based on usage pattern data.

In sharing power in accordance with the invention, the various batteries 5 of the electronic devices 1, 2, 3, etc. may be charged by transferring power from one or more of the power source outlet 40, CDU batteries 17, computing device batteries 15, or even sharing battery 5 charges amongst the electronic devices 1, 2, 3, themselves, all through CDU 30. This exporting and importing (i.e., sharing) of battery power between electronic devices 10, 25, 30, 1, 2, 3, etc. may be done through wired and/or wireless connections.

In one or more embodiments, the electronic device batteries 5 may be charged by transferring power from the power source outlet 40 and/or batteries 17 through the charge distribution unit 30. Alternatively, power may be transferred from the power source outlet 40 and/or batteries 15 through the computing device 25. The battery power output from the electronic devices may be stored in the batteries 15 or 17, respectively, of computing device 15 or charge distribution unit 30. The controller indicates how much battery power is to be allocated to each electronic device 1, 2, 3, etc., and then the charge distribution unit 30 outputs such battery power to the devices 1, 2, 3, etc.

Power can also be shared amongst the electronic devices 1, 2, 3, etc. in accordance with the invention. Electronic devices 1, 2, 3, etc. suitable for use in the invention may be adapted to output battery power. In this manner, the components of the invention may receive output battery power from the electronic devices 1, 2, 3, etc., and share such power with the computing device 25, charge distribution unit 30, and/or others of the electronic devices 1, 2, 3, etc. This is particularly beneficially in situations when there is not enough stored power on the computing device 25 and/or charge distribution unit 30 to share, and there is no available wall power source outlet 40. The export of power from the electronic devices 1, 2, 3, etc. may be directed and controlled by the controller 10, the charge distribution unit 30, or other component(s) within the systems of the invention.

It should also be appreciated that priority based charging of one or more of the electronic device 1, 2, 3, etc. may be implemented in the invention based on battery usage history and patterns stored in memory. For instance, if a user needs battery power on a device that is not normally scheduled or ready for recharge at a certain time of the day, and the user finds that they need to the device powered at such time of the day, the user may preempt the normal charging schedule and prioritize the charging of the device in need of charging. As an example, a user may need to use his smart-phone GPS at 3:00 pm, yet there is not enough battery power to operate the GPS and the smartphone is not scheduled for charging until 4:00 pm. The end user can make a command or instruction to over ride or prioritize the charging of the smart-phone over other devices that may be charged at that time to ensure that the smartphone has enough battery power to operate the GPS.

By continuously monitoring power state levels of each battery in communication with the present systems and components, battery power levels are controlled by maintaining a charge on the battery to continuously keep the batteries energized and avoid draining down to a zero (0%) power level. As mentioned above, predetermined high and low battery threshold levels may be set whereby once the low threshold is reached the electronic device is recharged. This charging may be done automatically when the electronic device is in communication with the present system, or upon an end user of the electronic device being informed by a signal, alert or alarm that is triggered once the battery power level is at or near the threshold level. It should also be appreciated that the battery power level thresholds used in the present invention may be set according to battery manufacturer specifications, or they may be determined and set by an end user of the invention.

In one or more embodiments, the invention manages and controls distributing charging power to each electronic device battery just prior to when the device will be needed for use, or in anticipation of upcoming customary usage of the device based on the historical usage patterns. The controller 10 may set these parameters to split allocation of battery power charging at a predefined or preset time, just prior to actual use of the electronic device, or even perhaps not until the battery has been drained down to a set power level as defined by the battery level threshold values. As such, the electronic devices will be ready for use when needed by maintaining battery level charges.

The invention leads to prolonging battery life as device batteries are not always fully changed when not needed since device batteries are allowed to drain and charge when needed. The invention also prevents infrequently used devices from being fully drained, rendering them useless when needed. These infrequently used devices may be connected to the present invention to maintain battery power thereon.

The present methods, components and systems of the invention may further be implemented by an end user filling out usage profiles for each electronic device 1, 2, 3, etc. For instance, the usage profile may include both weekday and weekend usages, as well as different times of day of heavy use and different lengths of time when the device is used on selected days. Once the electronic devices 1, 2, 3, etc. are in communication with and linked into the present system, the usage patterns of each device are monitored to learn differences in actual usage and perceived usage. This may be performed by the monitoring component or by the charge distribution unit. Once the system determines that it is time for one or more of the electronic device 1, 2, 3, etc. to be charged, the end user of such devices may receive a message (s) or alert on their watch or other device prompting that it is time for device battery charge-up.

The controller or the charge distribution unit may compute charge-up time to support any prolonged disconnected device usage based on user stated profiles and the monitored and stored battery usage patterns. Each electronic device 1, 2, 3, etc. is then charged by the charge distribution unit for the computed amount of charging time, thereby providing the electronic device(s) with enough battery power to execute or perform a function or activity. The charge distribution unit may also manage suitable charging of each device battery to prolong such battery life. For instance, the charge distribution unit may not charge the battery until use of the device is required, or until it is determined that battery power is actually needed (e.g., by a battery power threshold level being met). In certain instances, if the function/activity step leads to needing emergency charging levels, the charge distribution unit may use its own emergency central reservoir of stored battery power to sustain the functioning of the electronic device.

As another example of the invention, the controller 10, monitor 20, and charge distribution unit 30 may all reside within a single tablet controller 25 (e.g., a tablet, net book, notebook, iPad, etc.). The charge distribution unit 30 residing within and running on the tablet controller 25 may run through a wireless connection and networking to one or more electronic devices 1, 2, etc. having batteries 5 in need of charging. The end user may place his tablet controller 25 in/on a bag, backpack, purse, table top, desk, drawer, etc. The end user may also have a plurality of electronic devices 1, 2, etc. that are capable of wireless networking and communication. These devices have the ability to output battery signal data and output its own battery power charge, if necessary. They are also able to receive incoming battery power and any commands or instructions for outputting its own battery power charge. The plurality of electronic devices may include, but are not limited to, a smartphone, medical device, car or bike GPS, physical activity monitor, and the like.

In this example, the user provides each of his electronic devices near or in the vicinity of the tablet controller 25 (e.g., puts all his devices into a backpack). Each of these devices then starts to wireless network and communicate with the charge distribution unit 30. The charge distribution unit 30 receives the incoming battery signal data and transmits it to the monitoring component 20, which continuously monitors and receives the input battery signal data for transfer to the controller 10. The controller 10 analyzes the incoming battery signal data and determines when, where and how each battery 5 of each electronic device is to be charged through the charge distribution unit 30 for maintaining a continuous charge on each battery 5 for optimal use of each electronic device. For instance, the controller 10 may determine time of charging, how much charge is allocated to each battery, and which device/battery gets which allocated amount of charge. The various amounts of allocated charge are then discharged through the charge distribution unit 30 to batteries of their respective identified electronic device, as shown in FIGS. 1-4, for continuously controlling and maintaining battery charge on such devices so that such devices are ready for use when needed.

Figure 6A:
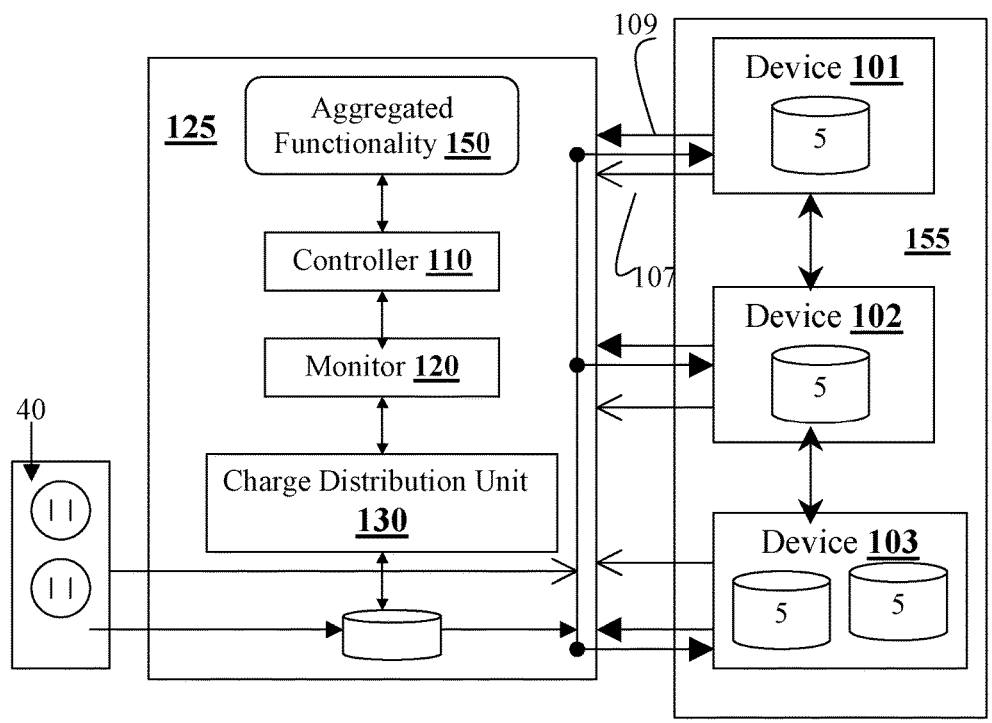
FIG. 6A and FIG. 6B illustrate different embodiments of aggregated device systems of the invention for completing a requested task in accordance with one or more embodiments of the invention.
Figure 6B:
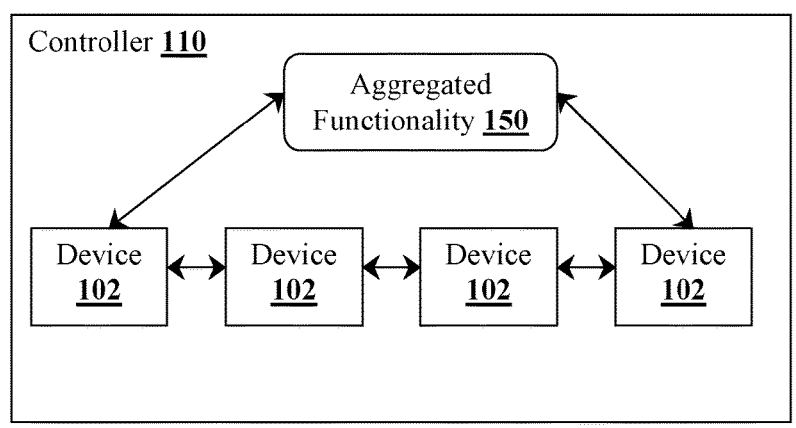

Flexible Device Function Aggregation:

Referring to FIGS. 6A-B, an aggregation of physical electronic devices 101, 102, 103, etc. is shown in accordance with one or more embodiments of the invention. Various functions are aggregated from each of the different physical electronic devices to generate a new aggregated device that has various features and functionality of the combined electronic devices. The new aggregated device may also have new features and functionality generated by the application and use of the combined functionalities form the combined electronic devices.

While the physical devices suitable for use may include those electronic devices 1, 2, 3, etc. described above, it may also include other known and yet to be discovered electronic devices. The aggregated devices may be a combination of electronic devices that all intercommunicate with each other, either wirelessly or wired. For instance, the aggregated devices may include, but are not limited to, a tablet, a cell phone, car GPS, bike GPS, medical device, laptop, iPod, and the like.

A computing device 125 is provided that includes at least a controller 110, monitoring component 120, battery power, and memory. In one or more embodiments, the computing device 125 also includes a charge distribution unit 130. The plurality of electronic devices 101, 102, 103, etc. are connect to, or in communication with, the computing device 125. These electronic devices transmit function signals 107 to the computing device 125. The function signals 107 include functionality information identifying those functions that can be performed on the particular electronic device such signal is associated with, or identifying functions that can be performed using such electronic device. A number of different function signals 107 from various different electronic devices 101, 102, 103, etc. may be input into the computing device 125 simultaneously or concurrently.

In those embodiments having the charge distribution unit 130, the battery signal data 109 (i.e., the battery level usage data and usage pattern data) may also be input into the computing device 125 along with the various different function signals 107. These input data signals 107, 109 may be used together to ensure one or more devices, alone or in combination, have enough battery power to carryout or perform a desired function(s) or task. That is, the above described methods, systems and apparatus for allocating, monitoring, and maintaining a controlled distribution of battery power to each device ensure that sufficient battery power is available for optimal and complete performance of the function or task to be full-filled.

In accordance with the invention, an aggregated functionality component 150 may be integrated into the computing device 125 (FIG. 6A) or into the controller 110 (FIG. 6B). The aggregated functionality component 150 may be a separate and distinct piece of hardware that includes circuitry and software for performing the tasks of aggregating together all input function signals 107, and analyzing these function signals 107 to determine which electronic devices are capable of carrying out, or helping to carry out, a task(s) requested by an end user. In certain embodiments the aggregated functionality component 150 may be circuitry residing with the computing device 125 or controller 110 that is reconfigured to perform the tasks of aggregating and analyzing the input function signals 107.

In analyzing the incoming function signals 107, the aggregated functionality component 150 stores in memory a table of all functions that can be performed by each respective electronic devices 101, 102, 103, etc. A user makes a request on the computing device 125 for a particular function or task to be performed. Using the stored data, the aggregated functionality component 150 then determines which of the electronic devices 101, 102, 103, etc. is able to perform the entire requested task, or perform specific parts or steps of such requested task. In accomplishing these steps each of the aggregated functionality component 150 and plurality of different electronic devices 101, 102, 103, etc. communicate and interact with each other, passing data and instructions back and forth.

The aggregated functionality component 150 may generate a listing or table of all electronic devices 101, 102, 103, etc. that are capable of accomplishing the requested task. The table may include single capable devices, or combinations of electronic devices that together can accomplish and complete the requested task. In one or more embodiments, the requested task may then be accomplished using the one or more electronic devices 101, 102, 103, etc. in combination with the computing device 125.

In other embodiments of the invention, once the aggregated functionality component 150 generates the table of capable electronic device(s) for carrying out the requested task, this 'table of capable devices' may be compared against the 'table of allocation of battery usage and pattern usage' having stored data identifying particular electronic devices as well as the amounts of battery power residing thereon. The controller 110 may compare these tables or another component within the computing device 125 that is capable of retrieving and analyzing data tables may be implemented.

The list of capable electronic device(s) is compared against the list of battery power usage and pattern usage data to determine how much battery charge each identified capable electronic device needs for carrying out the requested task, or at least how much battery charge it needs to fulfill its part or portion of the steps required for fulfilling the requested task. The computing device 125 may then transmit allocated battery power to each of these electronic devices, through the charge distribution unit 130, to perform the user's requested task by these device(s), all while the maintained battery charging of the invention ensures enough battery power to complete such requested task.

In these embodiments of the invention, user requested tasks may be performed by one or more electronic devices that are in communication with each other, and that are sharing each other's functionality to complete the requested task. A component within the computing device 125 allocates the device functions that each different electronic device is to perform, so that functionality for accomplishing the requested task is shared amongst the different electronic devices. In one or more embodiments this component may be the aggregated functionality component 150. The combined different electronic devices working together by sharing functions, data and inputs/outputs for accomplished the requested task is an aggregated-device 155, as shown in FIG. 6A. This aggregated-device 155 may communicate with the charge distribution unit 130 to monitor, control and maintain sufficient levels of power in batteries 5 of each of the joined electronic devices forming the aggregated-device 155. In this manner, the aggregated-device 155 will be able to complete the requested task since each electronic device will not run out of battery power since battery power is monitored and maintained by sharing battery power across the computing device 125, charge distribution unit 130, and all electronic devices 101, 102, 103, etc.

That is, the charge distribution unit 130 may determine the amount of battery charge required for each electronic device within the aggregated-device 155 to complete a selected task or function (e.g., a virtual function). The task(s) and/or function(s) may be defined by an end user, or the end user may select one or more from a stored library of tasks/functions. These selections may also include a desired time for when the user wants the task/function to be performed, as well as any other user defined operation or performance criteria for carrying out the task/function (e.g., a desired duration for performing the task, commands to repeat the task, refresh the task, etc.).

Since the aggregated-device 155 is a combination of electronic devices working together to perform a specific task, it may not be known how long such a task may take to complete across these devices. As such, it will also not be known, or easily discernible, how much battery power will be required amongst the multiple electronic devices to complete the task or function. Advantageously, the present methods, systems and apparatus for monitoring, allocating, distributing and/or maintaining battery power in each electronic device allows for stored repositories of battery power.

This stored repository power may be used when battery power is needed in emergency situations. Alternatively, it may be used when coverage of battery power in the electronic devices is not enough to complete the requested task. In one or more embodiments, either the controller 110 or the charge distribution unit 130 may determine any additional runtime to cover for charge overage useage during such runtime, and based on such information, store a reserve of power in its central repository for use when these energy overage events occur during use. Once the aggregated-device 155 is determined and any needed battery power charges to the electronic devices therein, the requested task or function may be performed.

While it is being performed, the monitoring component 120 continually monitors the charging power available on each electronic device. If it is determined that sufficient charge remains on the identified devices within the aggregated-device 155, the process continues. If, however, it is determined that power levels are getting too low, or near the predetermined threshold levels for recharging, and power levels can not be charged in enough time to complete the task, the system may then determine if another electronic device(s) (not previously selected) can be used to complete the task. These other devices compensate for the deficient device. If other electronic devices having enough battery power exist, and can be switched for use by the controller, then the system implements this other device(s) for completing the task or function. In one or more embodiments, if no other devices exist having enough battery, the reservoir of battery power on the computing device 125 may be used to complete the task.

Once the request task/function is finished by the aggregated-device 155 and/or computing device 125 the process ends. It should be appreciated that between each electronic device's processing steps, the controller may inject computation referred to as a "pipeline" stage to make the processing easier for the subsequent device. It should also be appreciated that the various electronic devices of the aggregated-device 155 may be used together to perform a task or function that is not capable on any one of such devices alone. They may also be used to execute and perform a new higher-level task or function previously not associated or identified on any of such electronic devices.

As an example of the invention, an end user may have a tablet or netbook 125 that includes the systems and apparatus of the invention. The end user may also have a number of other electronic devices on or near him (e.g., in his backpack) that run and execute various different tasks and functionality. The end user may input into his tablet 125 a request to perform a task that is not capable on any single one of his electronic device. For instance, he may want to take a bike ride while on vacation using his bike GPS connected to his handlebars, while also being informed of popular local vacationer hotspots and/or scenic locations. He also may have friends that reside at his vacation destination, and wants to be alerted if he is near any of these friends. His bike GPS may only be able to track and display his bike ride on its display screen. His smart phone has an app highlighting local vacationer hotspots and scenic locations, and another app that tracks identified friends proximity to the end user.

Upon the end user making a command on his tablet 125 to perform the identified functions, the controller 110 communicates and connects with all electronic devices on the end user (since he may also have an ipod, fitbit, etc. on him). Function signal 107 inputs from all electronic devices are received at the tablet 125, and then tablet components analyze these incoming function signals 107 to generate a list of devices that, when aggregated into the aggregated-device 155, can complete and fulfill the end user's request task. One of these combinations may be the bike GPS in aggregation with the smart phone, which when used in conjunction will fulfill the task. The tablet 125 formats a plan for the bike GPS and smart phone, which may include start and stop times if needed. Together within the formulated aggregated-device 155, the bike GPS and smart phone fulfill the user's requested task. The smart phone may use a mapping software app to locate destination scenic or hotspot locations, while a social networking app determines if any friends are available for contact during travel. The mapping software and social networking app's data is input into the bike GPS (which is capable of receiving such data), and used in combination with the GPS tracking software to display the bike route in combination with local hotspots and/or friends along such bike route.

In order to ensure that the bike GPS and smart phone can complete the end user's requested task, the battery power level monitoring and control aspects of the invention may be implemented. In doing so, the bike GPS and smart phone connect to the tablet 125 through the charge distribution unit 130. Along with the incoming function signals 107, the battery signal data 109 inputs from each device are also received by the tablet 125 through the charge distribution unit 130. The charge distribution unit 130 transfers these inputs to the controller 110 and/or monitoring component 120 for continued battery level monitoring and determination of which of the electronic devices have enough battery power for completing the task. Battery charging power may be transferred amongst the devices, through the charge distribution unit 130, to ensure complete and optimal performance by the devices within the aggregated-device 155 to complete the user's requested task. If the system determines that the smart phone is running out of battery and will not be able to complete the user's task, the system analyzes other devices and identifies the user's netbook as having enough battery power. The system may then switch use from the smart phone to the netbook within the aggregated-device 155 and system to complete the requested task.

Figure 7:
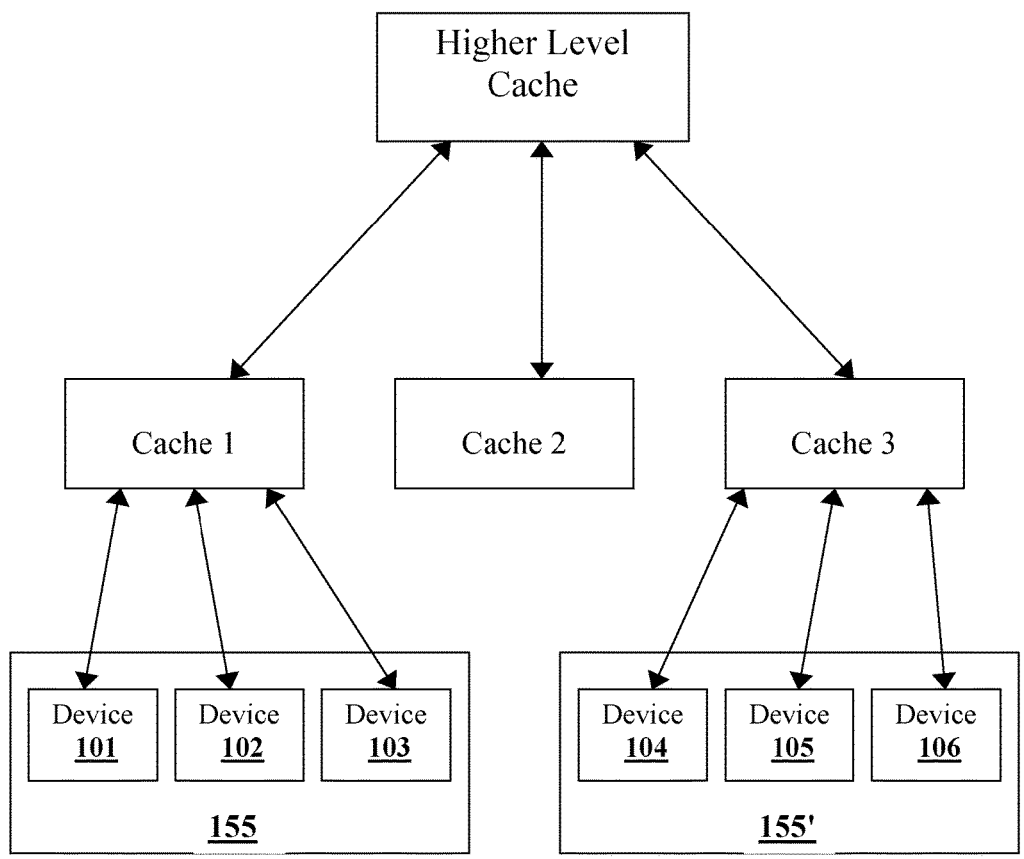
FIG. 7 illustrates a system of the invention for enabling cache management, proactive backup and aggregation of cached data, and establishing reconfigurable cache hierarchies in accordance with one or more embodiments of the invention

Reconfigurable Caching and Backup for Devices:

Referring to FIG. 7, in one or more embodiments the invention enables cache management, the proactive backup and aggregation of cached data, as well as establishing reconfigurable cache hierarchies. Each electronic device suitable for use in the invention has its own memory, with its own memory hierarchy. As these electronic devices interconnect and communicate with each other in the aggregated device 155 to fulfill the requested task, frequently used data between these different electronic devices is cached and shared by the invention, as needed, without repeated transfers to network servers. This is accomplished by generating a second memory hierarchy between these different sets of devices with spatial and temporal locality.

In accordance with the invention, data exchanged between the various electronic devices 101, 102, 103, etc. within each aggregated device 155 is transmitted to the computing device 125. A component within the computing device 125 (e.g., the controller 110) stores and analyzes such input data to determine use patterns of the data from the various electronic devices 101, 102, 103, etc. The input data is tagged with different identifiers based on frequency of use, for instance, from low frequency of use to high frequency of use. The tagged frequency data may be stored in cache or memory within one or more computing devices (e.g. computing device 125, controller 110, electronic devices 101, 102, 103, etc.) for later retrieval and use by all electronic devices connected to the present system.

In accordance with the invention, the cached tagged data is managed by generating a hierarchy of cached tagged frequency data, which may also be stored in cache or memory within one or more computing devices, or within components thereof (e.g., within controller 110), for later retrieval and use. Controller 110 may manage the cached tagged data that was input by the various electronic devices. This memory of hierarchy cached tagged frequency data improves performance by saving energy and network access costs since it provides an easily accessible route for the aggregated device 155 (or one or more electronic devices 101, 102, 103) to retrieve data.

For instance, if a select electronic device needs certain data stored within the cached tagged data, then this cached data residing within the second memory hierarchy is simply retrieved rather than performing another expensive and time consuming search. A short-range network may be used to transfer the data between devices and the cache storage. The hierarchy of cached tagged frequency data may include data exchanged by the devices, with one or more of the electronic devices being used for a common function integrated under a common cache hierarchy. Further, the caching of new data extrapolated from the aggregated device 155 may be shared and used amongst other aggregated devices 155', and their respective electronic devices 104, 105, 106, etc., generated and implemented in accordance with the invention, as shown in FIG. 7.

While not meant to be limiting, as an example of the invention a previously run aggregated device 155 session may have been performed to make a collage of pictures on a smart phone, with pictures being previously obtained from both a camera and an iPod within the aggregated device 155. All input picture data is stored and tagged within the smart phone. A new aggregation device 155' session is to be performed on a tablet, whereby selected pictures from the first session are desired to be used. While this pictures may be available in the cloud, the invention provides a managed and stored hierarchy of cached tagged frequency data that includes an identification of where the desired pictures can be obtained locally (e.g., from a cached version on the smart phone, or within memory on the originating iPod itself). The record of where these desired pictures exist within the first aggregated device 155 session is obtained, and then retrieved for use in the second aggregated device 155' session.

The invention also provides for the proactive backup and aggregation of new data. Newly created data on devices may be proactively saved, for example, when devices are docked back into the apparatus and/or systems of the present invention either through wired or wireless connections. For instance, newly created data on one or more devices may be proactively saved when such device(s) are docked or connected (either wired or wirelessly) back into the charge distribution unit 130 of the present systems. Proactive aggregation of data, either when devices are in use or docked back into the instant apparatus and/or systems, allows data to be aggregated and analyzed using an aggregated device 155.

In this aspect, the computing device 125 (e.g., through monitoring component 120, controller 110, etc.) continuously receives and aggregates new incoming data from different electronic devices 101, 102, 103, etc. within an aggregated device 155. The hierarchy of cached tagged frequency data is proactively backed-up with this new incoming data. In one or more embodiments, the new incoming data may be saved in the controlling computing device having reliable data storage, which may be internal or external. Alternatively, the new incoming data may be saved remotely in cloud storage that is accessible by the controlling computing device.

The proactive backup of new incoming data allows the controlling computing device to backup or archive this new data, which may be tagged with special flags for backup or archival. For instance, the computing device table may be updated with the name of the data object, address range and backup/archival flags. When network bandwidth and electronic device battery power energy (as discussed above) is available, the controlling computing device may proactively backup data from those electronic devices then active and using the controller table (which was updated with the name of the object, address range and backup/archival flags).

For instance, in one or more embodiments the invention provides for the integration of backup and read/write caching of incoming device signal data. In these embodiments this data may be tagged as "Backup", "Archive" or "Immediate." "Immediate" backup data objects are injected into the "cached" data pool so that they may be stored to the cloud when intermittent or low bandwidth is available. Any "Backup/Archive" flagged data may be stored to the cloud either at the end of the day or when known periods of backup are encountered. Newly generated data objects, as well as backed-up data objects, may be written to the "write" cache so when network bandwidth is available data objects based on priority may be saved to the cloud. Those data objects that have been purged from the controlling computer device memory, but are available or present in device(s) not in use (i.e., "sleeping" devices), may be retrieved in accordance with the invention based on charge availability determinations.

In the invention cached data from the various electronic devices may be stored in the device's own memory or in the controlling computing device 125, and both are reusable by other devices in the system or in later systems. After the new incoming data from the in use electronic devices has been backed-up, tagged and archived, the above discussed hierarchal cache table(s) of the invention may be reconfigured. This is accomplished by a component (e.g., controller 110) updating or refreshing the hierarchy of the cached tagged frequency data in each device connected to the present systems. That is, any previously established hierarchal cache table(s) of the invention, whether residing in the computing device 125, controller 110, electronic devices 101, 102, 103, etc., may be reconfigured and updated to incorporate all new incoming data. The frequency with which each new incoming cached data object is determined, ranked, tagged and then stored in the hierarchal cache table(s), thereby reconfiguring such cache tables.

The reconfiguration in accordance with the invention allows caches to be maintained between each device and each direction between devices. One or more caches may also be maintained for reads/writes to external network(s) or the cloud. The integration of backed-up new incoming data in accordance with the invention allows any such data objects with "Immediate" priority to be integrated into the reconfigurable caching network for backup/archival ahead of periodic backup/archival times. In order to maintain efficiency and speed in the instant methods, systems, and apparatus, any data objects that are identified as least use (i.e., used least recently in time) may be discarded (remove) from cache or the cache tables. Also, any media objects for storage to a cloud (write cache) may be stored in the controller 110 cache so that other devices may use these media objects at times when network bandwidth is low or network connection is unavailable. Further in accordance with the invention, controller memory may maintain caches for data transfer between devices so that any device may use this cache for restarting a computation or reusing data from a previous run of an aggregated device 155 session.

The invention advantageously integrates backing up of new incoming data from the various electronic device, including newly incoming function signal 107 data, with reconfigurable caching. These new incoming signals 107 include new or updated functionality information and data that identifies electronic devices and the functions that can be performed thereon. This new incoming data, once ranked and tagged can be reconfigured in the cache hierarchy that is stored on one or more of the devices. The invention enables caching and hierarchal caching to be shared amongst several electronic devices, as well as cloud reads and cloud writes. It also correlates caching and hierarchal caching tables with available energy levels residing on particular devices to carryout a requested task. The battery power level monitoring and allocation of the invention continuously monitors device battery power levels, and then allocates and distributes (through the CDU) power to such devices if needed to ensure completion of the task.

Figure 8A:
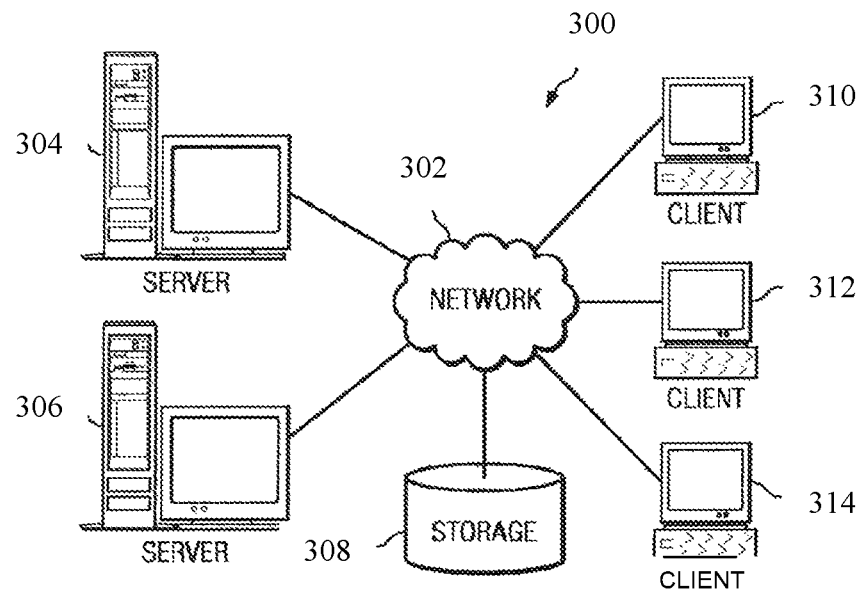
FIG. 8A illustrates a representation of a network of a data processing system in which embodiments of the invention may be implemented.
Figure 8B:
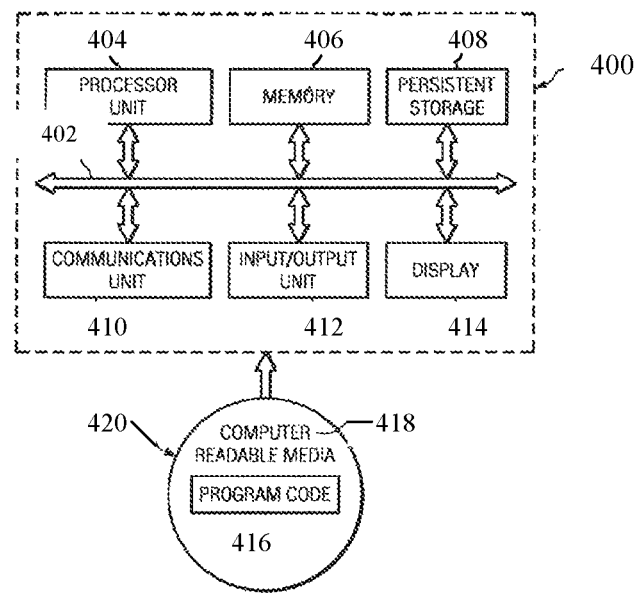
FIG. 8B illustrates a block diagram of a data processing system in which certain embodiments of the invention may be implemented.

Exemplary diagrams of data processing environments are shown in FIGS. 8A-B in which embodiments of the invention may be implemented. It should be appreciated and understood that these drawings are only exemplary and are not intended to assert or imply any limitation with regard to the environments in which different embodiments may be implemented. Many modifications to the depicted environments may be made.

A representation of a network of data processing systems in which embodiments of the invention may be implemented are shown in FIG. 8A. Network data processing system 300 may be a network of computers in which the illustrative embodiments may be implemented. Network data processing system 300 contains network 302, which is the medium used to provide communications links between various devices and computers connected together within network data processing system 300. Network 302 may include connections, such as wire, wireless communication links, or fiber optic cables.

In the depicted example, server 304 and server 306 connect to network 302 along with storage unit 308. In addition, clients 310, 312, and 314 (e.g., personal computers or network computers) connect to network 302. The servers may provide data, such as boot files, operating system images, and applications to clients 310, 312, and 314. Network data processing system 300 may include additional servers, clients, and other devices not shown. The program code located in network data processing system 300 may be stored on a computer recordable storage medium and downloaded to a data processing system or other device for use. For example, program code may be stored on a computer recordable storage medium on server 304 and downloaded to client 310 over network 302 for use on client 310.

Network data processing system 300 may be the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 300 also may be implemented as a number of different types of networks, such as, for example, an intranet, a local area network (LAN), or a wide area network (WAN), or within a cloud computing environment. Again, these figures are meant to be examples and not as an architectural limitation for the different illustrative embodiments.

The block diagram of FIG. 8B illustrates a data processing system of certain embodiments of the invention. The data processing system 400 is an example of a computer, such as server 304 or client 310 in FIG. 8A, in which computer usable program code or instructions implementing the processes may be located. The data processing system 400 may include communications fabric 402, which provides communications between processor unit 404, memory 406, persistent storage 408, communications unit 410, input/output (I/O) unit 412, and display 414.

A central processing unit (CPU) 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices. A storage device is any piece of hardware that is capable of storing information either on a temporary basis and/or a permanent basis. Memory 406, in these examples, may be, for example, a random access memory or any other suitable volatile or non-volatile storage device. Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410 provides for communications with other data processing systems or devices. In these examples, communications unit 410 may be a network interface card. Communications unit 410 may provide communications through the use of either or both physical and wireless communications links. Input/output unit 412 allows for input and output of data with other devices that may be connected to data processing system 400. For example, input/output unit 412 may provide a connection for user input through a keyboard and mouse. Further, input/output unit 412 may send output to a printer. Display 414 provides a mechanism to display information to a user.

Instructions for the operating system and applications or programs are located on persistent storage 408. These instructions may be loaded into memory 406 for use by processor unit 404. The processes of the different embodiments may be performed by processor unit 404 using computer implemented instructions, which may be located in a memory, such as memory 406. These instructions are referred to as program code, computer usable program code, or computer readable program code that may be read and performed by a processor in processor unit 404. The program code in the different embodiments may be embodied on different physical or tangible computer readable media, such as memory 406 or persistent storage 408.

Program code 416 may be located in a functional form on computer readable media 418 that is selectively removable and may be loaded onto or transferred to data processing system 400 for use by processor unit 404. Program code 416 (i.e., instructions) and computer readable media 418 form computer program product 420 in these examples. The computer readable media 418 may be in a tangible form, such as, for example, an optical or magnetic disc that is inserted or placed into a drive or other device that is part of persistent storage 408 for transfer onto a storage device, such as a hard drive that is part of persistent storage 408. In a tangible form, computer readable media 418 also may take the form of a persistent storage, such as a hard drive, a thumb drive, or a flash memory that is connected to data processing system 400. The tangible form of computer readable media 418 is also referred to as computer recordable storage media. In some instances, computer recordable media 418 may not be removable.

Alternatively, program code 416 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

In some illustrative embodiments, program code 416 may be downloaded over a network to persistent storage 408 from another device or data processing system for use within data processing system 400. For instance, program code stored in a computer readable storage medium in a server data processing system may be downloaded over a network from the server to data processing system 400. The data processing system providing program code 416 may be a server computer, a client computer, or some other device capable of storing and transmitting program code 416.

Again, these examples of the data processing system 400 are not meant to be limiting. Rather, the data processing system 400 may be implemented in various forms. For example, data processing system 400 may be a computer, a workstation, a laptop computer, a mobile phone, an end-user digital assistant, or some other suitable type of data processing system. The various embodiments of the invention may be implemented using any hardware device or system capable of executing program code.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for aggregating electronic devices for sharing functionality comprising:
    a computing device including storage and an aggregated functionality component;
    electronic devices;
    function signals transmittable among the electronic devices and the computing device to identify each electronic device and functions performable thereon;
    the storage storing tables of the identified electronic devices along with respective functions;
    a requested task input into the computing device;
    the aggregated functionality component comparing the requested task to the tables to determine ones of the electronic devices capable of performing at least a portion of the requested task; and the aggregated functionality component to generate an aggregated device comprising combinations of the ones of the electronic devices to accomplish the requested task, the system further comprising;

a charge distribution unit to receive battery signal data from the electronic devices to determine whether each electronic device has enough battery power to accomplish the requested task and transfer battery power to identified electronic devices for ensuring that the requested task is completed; and a controller receptive of the battery signal data to determine an allocated amount of battery power charge required for charging each electronic device, wherein the charge distribution unit transfers and splits each allocated amount of battery power charge to each electronic device to ensure battery power is available on each electronic device for accomplishing the requested task.

2. The system of claim 1 wherein the charge distribution unit comprises a wireless electronic device selected from the group consisting of a wireless charging mat, a wireless charging device, a wireless communication device, and solar photovoltaic cells.

3. The system of claim 1 wherein:

the input battery signal data further includes battery power usage patterns, based on the battery power usage patterns the controller further determines battery power distribution schedules for each electronic device, and the charge distribution unit transfers and splits each allocated amount of battery power charge to the electronic device based on the battery power distribution schedules.

4. The system of claim 1 wherein the aggregated device communicates with the charge distribution unit to control and maintain sufficient levels of battery power in each electronic device within the aggregated device for completion of the requested task.

5. The system of claim 1 wherein the computing device is selected from the group consisting of a laptop, tablet, notebook, netbook, smartphone, medical device, GPS device, social media device, Internet access device, stationary computing device and mobile computing device.

6. The system of claim 5 wherein the electronic devices are selected from the group consisting of a laptop, tablet, notebook, netbook, smartphone, medical device, GPS device, social media device, Internet access device, stationary computing device, mobile computing device, and combinations thereof.

7. The system of claim 1 wherein the electronic devices intercommunicate with each other and with the computing device through wired connections, wireless connections, or both wired and wireless connections.

8. The system of claim 1 wherein the aggregated functionality component is a separate hardware unit.

9. A method for aggregating electronic devices for sharing functionality, the method comprising:

disposing electronic devices in communication with a computing device having an aggregated functionality component;

transmitting function signals among the electronic devices and the computing device to identify each electronic device and functions performable thereon;

storing tables of the identified electronic devices along with respective functionse;

receiving a request for a task;

analzying the requested task against the tables to determine ones of the electronic devices capable of performing at least a portion of the requested task;

generating, by the aggregated functionality component, an aggregated device comprising combinations of ones of the electronic devices to accomplish the requested task the method further comprising;

receiving battery signal data from the electronic devices at a charge distibution unit;

determining, at the charge distibution unit, whether each electronic device has enough battery power to accomplish the requested task;

transferring battery power to identified electronic devices for ensuring that the requested task is completed;

receiving the battery signal data at a controller;

determining, at the controller, an allocated amount of battery power charge required for charging each electronic device; and transferring and splitting each allocated amount of battery power charge to each electronic device to ensure battery power is available on each electronic device for accomplishing the requested task.

10. The method of claim 9 further sharing power between the ones of the electronic devices.

* * * * *